May 17, 1932.     H. PAXTON     1,858,556
BOX LIDDING MACHINE
Filed July 17, 1930     2 Sheets-Sheet 1
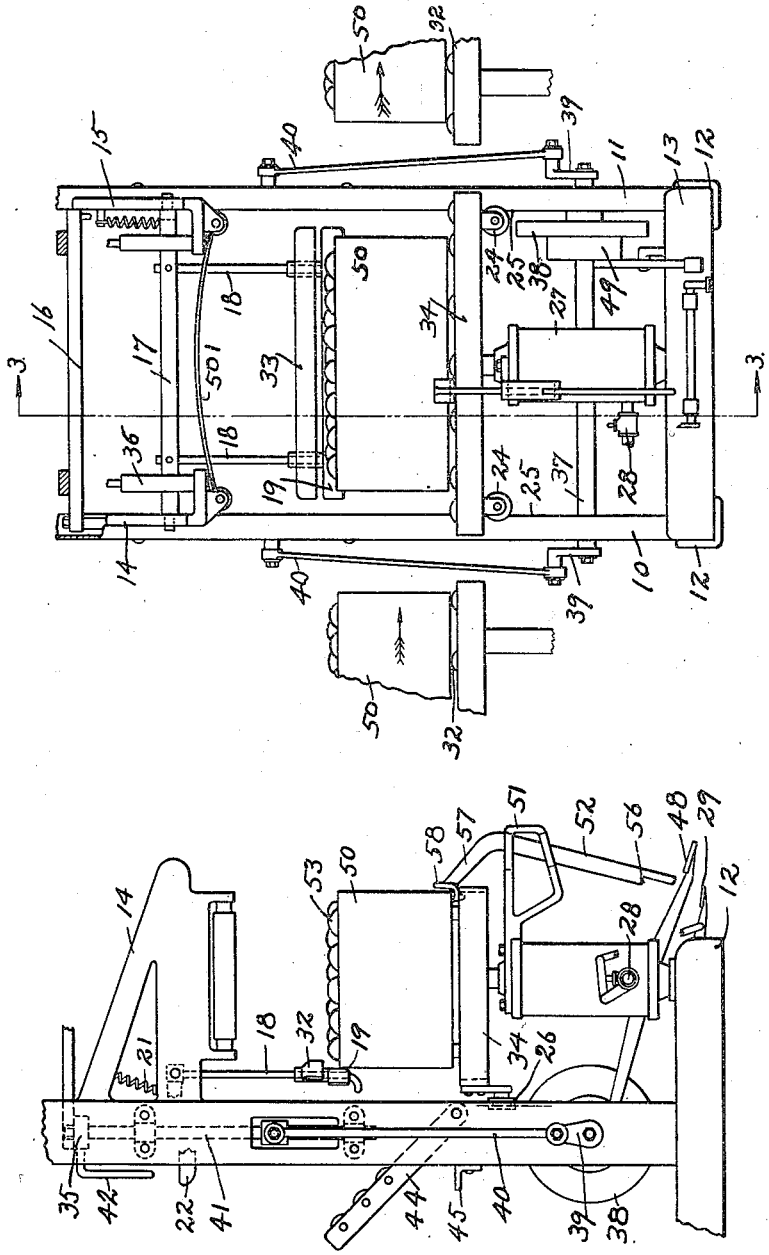
INVENTOR.
Hale Paxton
BY
Francis C. Huebner
ATTORNEY.

May 17, 1932. H. PAXTON 1,858,556
BOX LIDDING MACHINE
Filed July 17, 1930 2 Sheets-Sheet 2

INVENTOR.
Hale Paxton
BY
Francis C. Huebner
ATTORNEY

Patented May 17, 1932

1,858,556

UNITED STATES PATENT OFFICE

HALE PAXTON, OF SANGER, CALIFORNIA

BOX LIDDING MACHINE

Application filed July 17, 1930. Serial No. 468,682.

My invention relates to a box-lidding machine and more specifically to a device for tipping the box on its side and removing it after the lidding is accomplished. In packing fruit, such as apples, peaches, and similar fruits, it is usual to use a box having rigid sides and the bottom and lid constructed of thin yielding material which will bulge when the fruit is packed tightly within the box. Cleats are put over the top ends of the lid to hold the nails used for nailing the lids to the box. These cleats also serve to space the boxes apart when one is piled on the top of another. It is noted, however, that as the bottoms and tops of the box bulge after the fruit is packed therein, the fruit would easily be bruised by sliding the boxes so that the bottoms or tops came in contact with the slideway. The purpose of my invention, is to automatically and quickly turn the boxes on a side, immediately after being lidded so that the box of fruit can rest on the conveyor on its rigid side. The object I have accomplished is an improvement on a box lidding machine which automatically turns the box on its side after the lidding operation and removes it through the back of the lidding machine on to a conveyor.

In this connection attention is called to my pending application, filed May 13, 1930, No. 452,062, for a box lidding machine, and also to my application, filed May 13, 1930, No. 452,061, for automatic box moving means for lidding machine, this invention being a modification of and an addition to the inventions described in said applications.

Figure 4:
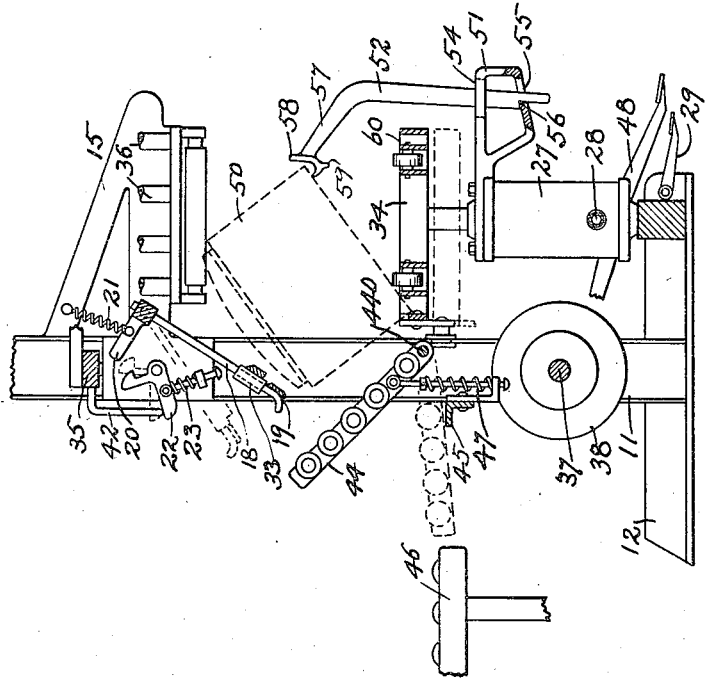
Figure 3:
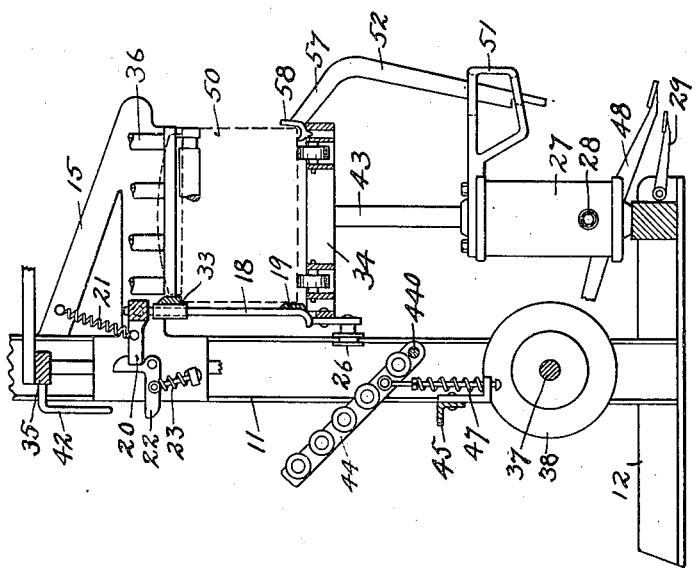

In the drawings accompanying this specification, Fig. 1 is a side fractional view of a nailing machine showing a box of fruit thereon ready to have the lid attached to the box. Fig. 2 is a front view of the device showing the box of fruit in the same position as shown in Fig. 1. Fig. 3 is a sectional view of the device along the line 3—3 in Fig. 2, this figure being modified by showing the nailing table in an elevated position. Fig. 4 shows the same view of the device disclosed in Fig. 3 after the lid is nailed on to the box, and shows the means for tipping the box on to the conveyor back of the machine.

Referring to the drawings, a frame is constructed of upright posts 10 and 11, of lateral base support 12, and cross supports 13. To the frame is rigidly attached an overhanging bracket consisting of two projecting arms 14 and 15, which are attached respectively to posts 10 and 11. The under surface of arms 14 and 15 are on a horizontal plane a spaced distance from the base. Cross beams 16 connect the projecting arms. A vertically movable nailing table 34 is provided. Supporting posts 10 and 11 are preferably formed of channel iron, one edge of the channel forming a guide rail 25. Grooved guide wheels 26 are carried on the nailing table and are adapted to ride on guide rail 25, the purpose of the rail and the guide wheel being to keep the movable table 34 in a fixed path. The table can be raised or lowered by means of a hydraulic jack of the well known form having a cylinder 27, a piston rod 43, and a valve 28 adapted to admit fluid under pressure within the cylinder, and at will to discharge it therefrom. The jack is actuated at will by means of pedal lever 29. Other means for raising and lowering the table can be used but the jack is preferred because a high pressure may be needed to raise the box, to hold it at any heighth at which it may be stopped, and to form a rigid base for supporting the nailing table while the nail driving device functions.

A box or crate 50 is shown on the box nailing table having fruit 53 therein. A series of rollers 32 are adapted for easily moving the box on to the table. Rollers of this character can be positioned on either or both sides of the table. A pivoted member 17 extends from arm 14 to arm 15, being pivotally attached thereto. Pivoted member 17 has depending rods 18 attached thereto and at the lower end of the rods is attached stop 19. Stop means 19 is positioned to hold the one side of the box in a fixed relation on the nailing table and also forms a gate at the back of the nailing table across the opening in the frame. To pivoted member 17 an arm 20 is attached at right angles thereto and by means of a tension spring 21, pivoted member 17, rods 18, and stop 19 are held normally in a position to make stop 19 inoperative. A catch 22 is pivotally attached to the frame in a position to cooperate with arm 20 and to hold it rigidly and thus make it operative as a stop for the box. By means of spring 23 catch 22 is normally held in operative relation with arm 20 and the swinging of rods 18 is adapted to engage catch 22 with arm 20.

On rods 18 is slidingly attached a follower 33 which is adapted to ride on the top edge of the side of the box adjacent to stop 19, the follower being adapted to push any overhanging fruit off of the edge of the side of the box into the box and as the box is raised to follow the box to the position of nailing the lid thereon, thus preventing the fruit from being crushed between the lid and the top edge of the side of the box.

The lidding machine is provided with a driving head 35 which is adapted to actuate the nail driver 36. The driving head has a vertical reciprocating movement which is conveyed to it by means of wheel 38, which is attached to shaft 37, which shaft carries crank 39, the crank being connected with the driving head by means of connecting arm 40 and a vertically sliding member 41. The nailing means is actuated at will by the movement of pedal lever 48. It will be noted that the movement of the combined jack and nailing table is wholly independent of the movement of the nailing device.

Assuming that table 34 is at the lowest point of its travel and a box of fruit is moved thereon as shown in Figs. 1 and 2, and stop 19 is positioned and adjusted to stop the box at a defined position, the hydraulic jack 27 is then made to function to raise the box to the lid, and to the nailing means for the purpose of lidding the box. Follower 33 accompanies the box of fruit preventing the fruit from overhanging the side of the box until it is lidded. When the box is lidded the next step is to lower the table with the box thereon. On the downward movement of the nailing head a trip 42 functions to disengage catch 22 with arm 20.

Trip 42 is attached to the driving head and is aligned with the arm 20 on catch 22, so that when the nails are driven, catch 22 is simultaneously released from engagement with arm 20, and spring 21 assists in swinging the stop 19 away from the box. Box 50 is then tipped toward stop 19 as hereinafter explained, which assists in holding the catch and arm in disengagement, and the box slides over rear conveyor 44. When the box is moved past stop 19 by its weight the stop swings like a pendulum against the spring 21, and its return oscillation swings far enough for the member 20 to engage catch 22, thus placing stop 19 in position for the next box.

It will be noted that the uprights 10 and 11 are far enough apart to permit box 50 to pass between them and when stop or gate 19 is inoperative and swinging about pivoted member 17, box 50 can be pushed through the back of the machine on to conveyor 44. By gravity the box will drop to support 45 when it is tipped over far enough. The position of conveyor 44 when in a lowered position is shown in dotted lines on Fig. 4. This conveyor when thus lowered is in position to connect with a discharge conveyor 46.

Conveyor 44 is pivotally connected at end 440 to uprights 10 and 11 and is held in a semi-upright position by a compression spring 47. The purpose of holding conveyor 44 in the semi-upright position is to dispense with a jar to the fruit when the box is dropped on the conveyor as hereinafter more fully set forth, inasmuch as spring 47 will yieldingly receive the box and lower it to the position where it can be rolled on to the discharge conveyor 46.

For the purpose of tipping the box over on its side and on to conveyor 44, I have provided a bracket 51 which is attached to jack cylinder 27 or to other stationary part of the frame. This bracket has slideway openings 54 and 55 therein. Pusher 52 consists of a bar adapted to slide through openings 54 and 55. Said pusher has a shoulder 56 formed at the lower end thereof which is adapted to catch on bracket 51 when the pusher is moved up far enough for that purpose. Said pusher also has a bent portion 57 at the end opposite to the shoulder which bent portion terminates in a hook 58, said hook having a downwardly projecting member 59, which is adapted to enter hole 60 in the nailing table. The hook 58 is positioned so that when projection 59 is within hole 60 on the nailing table and a box is moved on said nailing table the hook will engage the bottom of the box adjacent to the side farthest removed from stop 19. As the box is moved upward the pusher follows the box as shown in Fig. 3. When the box has reached the upper limit of its travel, shoulder 56 will engage bracket 51, and as the pusher is loosely held within openings 54 and 55 when the table is lowered the pusher will raise the outer side of the box as shown in Fig. 4 until the box tips over on its side on conveyor 44, and when thus released the pusher 52 will fall back into inactive position as shown in Fig. 1.

As the conveyor 44, when in its downward position resting on stop 45 is slightly on an incline, the box when thus tipped over on its side on conveyor 44 will be given a slight impetus to roll on the conveyor table and on to discharge conveyor 46.

The lid shown in Fig. 2 is designated 501.

Having described my invention, I claim as new and ask for Letters Patent:

1. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, and means for making said stop inoperative when the nailing table is approximately at the top of its path of travel.

2. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, and independent means for releasing said catch and for holding said gate open until the nailing table reaches the lower end of its path of travel.

3. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, and means on the driving head adapted to release said catch on the downward movement of the driving head.

4. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, and means actuated by the downward movement of the driving head to release said catch.

5. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, and means for tipping a box on the nailing table on its side and toward said opening consisting of a stop positioned in the path of travel of one side of the box on the downward movement of the nailing table.

6. In combination with a box lidding machine having a frame, a nailing table adapted to be raised and lowered, means for raising and lowering said nailing table, a reciprocating driving head, and an opening in the rear of the machine, adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, and means for tipping a box on the nailing table on its side and toward said opening in the back of the frame, said tipping means consisting of a stop positioned in the path of travel of one side of the box on the downward movement of the nailing table.

7. In combination with a box lidding machine having a frame, a nailing table adapted to be raised and lowered, means for raising and lowering said nailing table, a reciprocating driving head, and an opening in the rear of the machine adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, means for tipping a box on the nailing table on its side and toward said opening consisting of a stop positioned in the path of travel of one side of the box on the downward movement of the nailing table, and a runway attached to the frame adapted to receive the box at the opening when thus tipped over on its side.

8. In combination with a box lidding machine having a frame, a nailing table adapted to be raised and lowered, means for raising and lowering said nailing table, a reciprocating driving head and an opening in the rear of the machine adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, means for tipping a box on the nailing table on its side and toward said opening consisting of a stop positioned in the path of travel of one side of the box on the downward movement of the nailing table, and a runway attached to the frame adapted to receive the box at the opening when thus tipped over on its side, and to convey it by gravity from the said machine.

9. In combination with a box lidding machine having a frame, a nailing table adapted to be raised and lowered, means for raising and lowering said nailing table, a reciprocating driving head and an opening in the rear of the machine adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, means for tipping a box on the nailing table on its side and toward said opening consisting of a stop positioned in the path of travel of one side of the box on the downward movement of the nailing table, and a runway yieldingly held in an inclined position adapted to receive the box when tipped over on its side.

10. In combination with a box lidding machine having a frame, a nailing table adapted to be raised and lowered, means for raising and lowering said nailing table, a reciprocating driving head and an opening in the rear of the machine adapted for a box to pass through, of a gate adapted to be held in operative relation as a stop adjacent to the nailing table and across said rear opening when the nailing table is at its lowest point of travel and during the upward travel of said nailing table, the top of said gate being hingedly attached to the frame, a catch adapted to hold said gate in a rigid closed relation to said opening, means actuated by the downward movement of the driving head to release said catch, means for tipping a box on the nailing table on its side and toward said opening on the downward movement of the nailing table, and means for receiving the box when thus tipping on its side consisting of a runway normally held in a yieldingly inclined position and adapted by the weight of the box thereon to be depressed to a position where said box will be conveyed by gravity from said machine.

11. In combination with a box lidding machine having a nailing table adapted to be raised and lowered, means for raising and lowering said nailing table, a reciprocating driving head, and an opening through the rear of the machine adapted for a box to pass through, of means adapted to tilt a box on the nailing table on its side and toward said opening in the rear of the machine, said tilting means being timed to function on the downward movement of the nailing table.

12. In combination with a box lidding machine having a frame, a nailing table adapted to be raised and lowered, an independent reciprocating driving head, and an opening in the frame adapted for a box to pass through from the nailing table, of a gate adapted to be held in operative relation as a stop across said opening, when a box is being positioned on the nailing table, and means for making said gate inoperative as a stop actuated by a movement of the nailing head.

13. In a box lidding machine, the combination of: means for receiving packed boxes; means for securing lids thereto; and means for discharging the lidded box from said lidding machine with the box turned on its side.

14. In a box lidding machine, the combination of: box receiving and lidding mechanism; a discharge conveyer for conveying lidded boxes away from said mechanism; and means actuated by said mechanism for automatically tilting lidded boxes so that they are discharged on said conveyer on their sides.

15. In a lidding machine, the combination of: a lidding mechanism; an elevator for receiving a box and lifting it into operative relation with said mechanism; a discharge conveyer for receiving boxes from said elevator; and means for tilting a box just previously lidded on its side for movement on said discharge conveyer, said means effecting said tilting during a subsequent operation of said elevator.

16. In a box lidding machine, the combination of: means for lidding a box including box handling mechanism, lid handling mechanism and means for moving one of said mechanisms vertically toward the other to lid said box; and means actuated in conjunction with said moving mechanism for automatically tilting a lidded box so that it may be discharged from said lidding machine on its side.

17. In a box lidding machine, the combination of: means for lidding a box including box handling mechanism, lid handling mechanism and means for moving one of said mechanisms vertically toward the other to lid said box; a box discharge conveyer substantially on the same level as said box handling mechanism; and means actuated in conjunction with said moving mechanism for automatically tilting a lidded box so that it may be discharged from said lidding machine on its side onto said discharge conveyer.

18. In a machine for lidding boxes of fresh fruit in which the fruit extends above the top of the box, the combination of: lidding means including mechanism for handling a packed box having the fruit extending above the top thereof, mechanism for handling a lid, and means for moving one of said mechanisms vertically toward the other to apply said lid to said box so that the lid will be bowed upward in the middle, and means for securing ends of said lid to said box; a box discharge conveyer substantially on the same level as said box handling mechanism; and means actuated by said moving mechanism for automatically tilting the lidded box so that it may be discharged from said lidding machine on its side on said discharge conveyer.

19. In combination: means for receiving a box packed with fresh fruit; securing means disposed overhead; means for moving one of the aforementioned means towards the other to secure a lid to said box; and means automatically operated in conjunction with said moving means during a given cycle of operation thereof for tilting onto its side a box operated on during said cycle of operation and discharging said box on its side from said machine.

20. In combination: means for receiving a box packed with fresh fruit; securing means disposed overhead; means for moving one of the aforementioned means toward the other to secure a lid to said box; and then return to its normal position; and means automatically operated in conjunction with a normalizing movement of said moving means for tilting onto its side a box which has just been operated on to permit said box to be discharged from said machine on its side.

21. In combination: means for receiving a box packed with fresh fruit; means for securing lids successively to said boxes thus received; a discharge conveyer for receiving said boxes from said machine after lids have been secured thereto; means for tilting each box on its side after it has been operated on in said machine; and means for checking the descent of said box as it turns on its side incidental to its discharge from said machine.

22. In combination: means for receiving a box packed with fresh fruit; means for securing lids thereto; a discharge conveyer leading from said machine; a bridge conveyer disposed adjacent to said box receiving means and normally elevated at an angle from the horizontal; and means for tilting each box after it is operated on in said machine onto its side on said bridge conveyer so as to depress the latter and permit said box to roll on its side over said bridge conveyer onto said discharge conveyer.

23. In combination: means for receiving a box packed with fresh fruit; securing means disposed overhead; means for moving one of the aforementioned means toward the other to secure a lid to said box; a discharge conveyer leading from said machine; a bridge conveyer disposed between said box receiving means and said discharge conveyer and normally yieldably held at an elevated position; and means actuated in conjunction with the aforesaid moving means to tilt a box immediately at the conclusion of its being operated upon in said machine so that said box is turned on its side on said bridge conveyer and depresses said conveyer to permit said box to travel thereover onto said discharge conveyer.

24. In combination: means for receiving a box packed with fresh fruit; securing means disposed overhead; means for elevating said box receiving means to have a lid secured to a box carried thereon; and lower said box receiving means to permit the discharge of said box from said machine; and means engaging a portion of said box when said receiving means is lowered to tilt said box on said receiving means and discharge it from said machine on its side.

25. In a box lidding machine, the combination of: box receiving means adapted to receive a box from one side of said machine, there being an opening in said machine for discharging a lidded box rearwardly therethrough; lidding means disposed over said box receiving means; means for moving one or the aforementioned means vertically towards the other to lid a box; stop means adapted to be operatively positioned opposite said opening to position a box on said receiving means ready for lidding; and means for automatically rendering said stop means inoperative immediately following a lidding operation to permit a lidded box to be discharged rearwardly through said opening.

26. A combination as in claim 25 in which said last mentioned means is responsive to a box, so discharged, to automatically return said stop means to its aforesaid operative position.

27. A combination as in claim 25 in which said box receiving means lifts said box into contact with said lidding means and in which said stop means includes a follower which is engaged by the rear side of the box and lifted therewith incidental to the lidding operation.

HALE PAXTON.